United States Patent Office 3,440,210
Patented Apr. 22, 1969

3,440,210
STABILIZATION OF POLYOLEFINS WITH OXALYL DIHYDRAZIDES
William W. Blount, Jr., Roger E. Gibson, and Clarence E. Tholstrup, Kingsport, Tenn., assignors to Eastman Kodak Company, Rochester, N.Y., a corporation of New Jersey
No Drawing. Continuation-in-part of application Ser. No. 536,629, Mar. 23, 1966. This application May 17, 1968, Ser. No. 729,906
Int. Cl. C08f 45/58, 47/04
U.S. Cl. 260—41         8 Claims

ABSTRACT OF THE DISCLOSURE

Polyolefins containing N-benzal-(oxalyl dihydrazides), N,N'-dibenzal-(oxalyl dihydrazides), and derivatives thereof, to inhibit the degradative effects caused by the presence of copper or copper-bearing materials.

---

This application is a continuation-in-part of Ser. No. 536,629, filed Mar. 23, 1966, now abandoned.

This invention relates to the stabilization of poly-α-olefin compositions that are ordinarily susceptible to degradation when they are in physical contact with copper and copper-containing alloys. A preferred embodiment of the present invention relates to polypropylene compositions that are stabilized against such degradation.

It is generally known that polyolefins are subject to degradation initiated and catalyzed by various factors such as oxygen, heat, ultraviolet light, and metals. Against such degradation, many material have been found that, when they are blended into the polymers, provide an acceptable level of protection. This has been especially true of degradation caused by ordinary heat, oxygen, and ultraviolet light. One type of degradation for which an adequate inhibitor has not yet been found is degradation of poly-α-olefins caused by physical contact with copper, or copper-containing alloys. Evidently, physical contact with copper causes a reduction in the useful "lives" of such polymers of as much as ninety percent or more. In the case of polypropylene, which ordinarily has excellent electrical properties and exceptional covering capacity (per pound of polymer), the potential use of this polymer as an electrical insulating material (on wire for example), has not been fully exploited to date due to the very high degree of degradation (of the polymer) that occurs when it is in contact with the surface of the copper. While certain materials have been suggested heretofore as inhibitors for such copper-catalyzed degradation (for example, oxanilide and the well-known phenolic type antioxidants), because of several factors including cost and various properties of the "inhibitors" (for example, they "bleed" from the polymer and/or discolor or dye the polymer), there has not, heretofore, been available a completely acceptable way to stabilize these susceptible polyolefins against copper-catalyzed degradation.

It has now been discovered, however, that this undesired degradation can be effectively inhibited by incorporating into the susceptable poly-α-olefin a relatively small amount of a benzal-type oxalyl dihydrazide, having the structure of Formula I:

(I)        O=C—NH—N=A
           |
           O=C—NH—N=B wherein A and B are selected from the group consisting of:

(a) $H_2$, and (b) benzyl type radicals having the structure of Formula II:

(II) 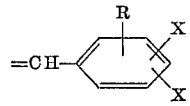

wherein R is a monovalent radical selected from the group consisting of hydrogen, alkyl (1–20 carbon atoms, preferably lower alkyl, 1–4 carbon atoms), and alkoxyl (1–20 carbon atoms, preferably lower alkoxyl, 1–4 carbon atoms), and X is selected from the group consisting of hydrogen and the halogens; and at most one of A and B is $H_2$.

Typical examples of the alkyl and alkoxy substituents that can be utilized are methyl, ethyl, n-propyl, isopropyl, n-butyl, isobutyl, t-butyl, methoxyl, ethoxyl, propoxyl, isopropoxyl, n-butoxyl, isobutoxyl, t-butoxyl, octyl, isooctyl, dodecyl, tetradecyl, dodecoxyl, octadecyl, hexadecyl, hexadecoxyl, and the like while one or two of any of the halogens (F, Cl, Br, I, and the like) can also be attached to the "benzene" ring in the stabilizers of this invention.

However, it is preferred that stabilizers in which R and X are each hydrogen be utilized. When R and X are each hydrogen in this preferred practice, Formula I, above, encompasses only two compounds:

(a) N,N'-dibenzal-(oxalyl dihydrazide), which has the following structure:

(III) 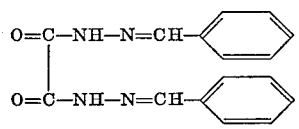

and (b) N-benzal oxalyl dihydrazide, which has the following structure:

(IV) 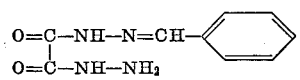

Of these, the use in the practice of this invention, of N,N'-dibenzal-(oxalyl dihydrazide) is particularly preferred because of its very high degree of effectiveness.

The materials of Formula I can be manufactured by reacting together in a solvent such as xylene appropriate amounts of oxalyl dihydrazide and the appropriate aldehyde (such as benzaldehyde for the manufacture of the preferred materials), preferably at reflux temperatures while water is continuously removed from the reaction zone.

The concentration of the benzal-type oxalyl dihydrazides (useful in the practice of this invention) is at an effective stabilizing value. This value generally depends upon the extent of the stabilization desired, which in turn depends upon many variables (that are readily appreciated by those in the art) such as the particular end use of the stabilized product, the processing conditions to which the stabilized product is to be subjected, and the life expectancy desired for the stabilized product. Generally, however, the concentration of benzal-type oxalyl dihydrazide will be within the range of from about 0.001 to about 10 weight percent, preferably within the ratio from about 0.005 to about 3 weight percent, based on the weight of the poly-α-olefin with which the benzal-type oxalyl dihydrazide is intermixed. Also, generally in the preferred practice of this invention, relatively higher levels of the mono benzal-type material will be needed to achieve a given degree of stability, as compared to results obtainable by use of the di-benzal material.

It is also pointed out that, in general, these benzal-type oxalyl dihydrazides do not create difficult or impossible color matching problems when incorporated into pigmented polyolefins since they are substantially white in color whereas certain other oxalyl dihydrazide derivatives are highly colored. This advantage is particularly evident with N,N'-dibenzal-(oxalyl dihydrazide).

Among the poly-alpha-olefins which are especially susceptible to spontaneous degradation when they are contacted with copper or copper-containing alloys are all of those polymers which result from the polymerization of alpha-olefins that contain 3–20 carbon atoms. Included among the poly-alpha-olefins especially susceptible such spontaneous degradation are block or graft copolymers having at least a significant portion of their molecules in the form of such polymerized alpha-olefins including copolymers of ethylene and propylene in which the ethylene comprises up to about 98 weight percent of said copolymer. The specially inhibited compositions of the present invention comprise the combination of such ordinarily copper-degradable poly-alpha-olefins and the benzal-type oxalyl dihydrazide inhibitor. The poly-alpha-olefin portion of such compositions generally comprises at least one, normally solid, poly-alpha-olefin derived from a 1-monoolefinic hydrocarbon containing 3–20 carbon atoms, typically 3–10 carbon atoms, and in addition, can comprise a mixture of such a poly-alpha-olefin with up to about 98 weight percent polyethylene. Examples of normally solid poly-alpha-olefins that are ordinarily subject to the copper-catalyzed degradation described above include the linear or branched, low density, medium density, or high density, crystalline or amorphous, normally solid homopolymers of propylene, 1-butene, isobutylene, 1-pentene, alpha-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, 1-alkenyl benzene, and the like; mixtures thereof with each other or with polyethylene; and copolymers thereof with each other or with ethylene. Polyethylene is not as susceptible to degradation when in physical contact with copper as polymers derived from olefins containing 3 or more carbon atoms. However, if polyethylene is employed in such a way that degradation by physical contact with copper becomes objectionable, the polyethylene can be stabilized in accordance with our invention. Processes for preparing such normally solid poly-alpha-olefins are well known and need not be detailed here. For example U.S. patent 2,153,553 to Fawcett et al., U.S. Patent 2,912,429 to Cash and U.S. Patent 2,917,500 to Hagemeyer et al. illustrate such processes. The term "normally solid poly-alpha-olefins" as used herein means a thermoplastic material (derived as stated above) which is solid at 20° C. The term also includes the so-called poly-alpha-olefin waxes (normally having average molecular weights of from about 3,000 to about 12,000) that are so derived.

It should be noted that the normally solid poly-alpha-olefins that are useful in the successful practice of the present invention can be intermixed with other polymeric materials (usually a different kind of polymers that is present as a physical property improver, e.g. brittleness characteristics at low temperatures) without detracting substantially from the benefits that can be derived from practicing the invention. In addition, other additives can be present in the specially stabilized compositions of this invention. For example, antioxidants, thermal stabilizers, ultraviolet light stabilizers, anti-corrosive agents, antistatic agents, foaming agents, plasticizers, colorants such as dyes and pigments, waxes, mold release agents, slip and/or antislip agents, antiblocking agents, filters, extenders, and the like, including physical property improvers other than the aforementioned polymeric compounds can all be utilized. Also mixtures of the copper inhibitor-stabilizers of the present invention can be used in the successful practice thereof.

The normally solid, poly-α-olefin resin composition of this invention can be mode by incorporating the benzal-type oxalyl dihydrazide material into the normally solid, poly-α-olefin resin material. Generally, such incorporation is performed by any one of a number of known methods, such as, for example, roll compounding, extrusion, solvent mixing and the like. For instance, such incorporation can be performed by heating or otherwise softening the normally solid resin material to a workable consistency and then working in, as by roll compounding, the benzal-type oxalyl dihydrazide of this invention until a substantially uniform blend or dispersion is obtained. Generally, such incorporation takes place at the same time that other additives are normally incorporated into the poly-α-olefin resin material and usually along with such other additives as the formulation of the particular embodiment of the plastic composition requires.

In addition to being useful as a coating material for copper wire, the normally solid plastic compositions of this invention are useful in other types of coating and as materials of construction for shaped articles. Thus, the compositions can be made into various shaped articles such as, for example, pellets, sheeting, films, bars, tubes, filaments, and specially shaped structural elements such as those made by conventional casting and molding techniques (which include extrusion, blow molding, and the like). The presently stabilized materials can also be impregnated with copper and copper-containing pigments for certain special effects, if desired.

In the following examples, which are illustrative of some of the preferred embodiments of this invention, all parts given are by weight unless otherwise specified.

In the following examples, the term "oven aging longevity" is used to designate the number of hours that a test specimen survived continuous exposure (in the form of bars (8½" x ¾" x ⅛")) in a Hotpack oven having a relatively low level of internal air circulation at a temperature of 150° C. (302° F.). The first signs of oxidative degradation are taken to denote failure of the specimen. Each test is run with ten test bars distributed throughout the oven, and the "oven aging longevity" figure give is an average of the ten results. Results of this test are believed to simulate results in actual practice in a relative manner.

EXAMPLE 1

A polypropylene-polyethylene blend having the following characteristics:

Flow rate (ASTM D–1238) _____grams/10 min__ 3.5
Density (ASTM D–1505) _____ 0.904
Softening point (ASTM D–1525), ° C. _____ 132 is stabilized by first fluxing a mixture of 983 parts of the polymer blend 5 parts of N,N'-dibenzal(oxalyl dihydrazide), and 12 parts of a commercial copper-bronze pigment containing about 72 percent of copper, and having an average particle size of less than about 44 microns, in a Banbury mixer, then extruding the resulting blend at a temperature of 275–280° C. and finally molding the extruded blend into the appropriate "tensile" bars for oven testing. This stabilized material has an oven aging longevity of about 180 hours, as compared with an oven aging longevity of only about 5 hours for an otherwise similar (but unstablized) polymeric pigmented material.

EXAMPLE 2

In a blend prepared as in Example 1, above, 5 parts of N-benzal-(oxalyl dihydrazide) are used (in place of the N,N'-dibenzal-(oxalyl dihydrazide) of Example 1). The resulting blend has an oven aging longevity value of 80 hours.

EXAMPLE 3

A blend of 30 parts of a commercial copper (pigmented) powder containing approximately 72% of copper and having an average particle size of less than about 44 microns, 50 parts of N,N'-dibenzal-(oxalyl dihydrazide), and 9920 parts of polypropylene having the following characteristics:

Flow rate _____ 4.5
Density _____ 0.902
Softening point, ° C. _____ 148 are blended via the procedure of Example 1, above. The resulting blend has an oven aging longevity of 430 hours. Note that this is at an inhibitor level of only 0.5 weight percent. At a still lower inhibitor level of only 0.3 weight percent, the oven aging longevity value is 280 hours. This is to be compared to an uninhibited oven aging longevity value for a similarly pigmented polypropylene of only 5 hours.

EXAMPLE 4

Using 100 parts of the commercial copper-containing pigment described in Example 3, above, 50 parts of N-benzal-(oxalyl dihydrazide) and 9850 parts of a polyallomer having the following characteristics:

Flow rate _____ 2.0
Density _____ 0.902
Softening point, ° C. _____ 126 an inhibited polymer blend is prepared via the procedure of Example 1 above. The resulting blend has an oven aging longevity value of more than 40 hours. An uninhibited pigmented polymer having otherwise the same characteristics has an oven aging longevity of less than 5 hours.

It is interesting to note that in the presence of N-benzal-(oxalyl dihydrazide), a synergistic stabilizing effect can be observed when this material is used in combination with 2,6-bis(methylheptadecyl)-p-cresol. Thus, while the use of 0.3% of this cresol in the otherwise uninhibited pigmented polymer system of Example 4 yields a material having an oven aging longevity value of only 5 hours, a blend of equal amounts of N-benzal(oxalyl dihydrazide) and this cresol (at 0.3% each) yields a stabilized copper-pigmented polymer composition having an oven aging longevity of as much as 120 hours. In this particular aspect of the present invention (a mixture of N-benzal-(oxalyl - dihydrazide) and 2,6-bis(methylheptadecyl)-p-cresol capable of synergistically acting to inhibit the copper degradation of susceptible poly-α-olefins when intermixed therewith) the ratio of dihydrazide to cresol should be within the range of from about 1:10 to about 10:1, respectively. Usage levels of this mixture in the susceptible polymers is of the same order of magnitude as that described hereinbefore for the benzal oxalyl dihydrazides, themselves.

EXAMPLE 5

A blend of 30 parts of a commercial copper (pigmented) powder containing approximately 72% of copper and having an average particle size of less than about 44 microns, 25 parts of N,N'-dibenzal-(oxalyl dihydrazide), 25 parts of N-benzal oxalyl dihydrazide, and 9920 parts of polypropylene having the following characteristics:

Flow rate _____ 4.5
Density _____ 0.902
Softening point, ° C. _____ 148 are blended via the procedure of Example 1, above. The resulting blend has an oven aging longevity of 310 hours. Note that this is at an inhibitor level of only 0.5 weight percent. At a still lower inhibitor level of only 0.3 weight percent, the oven aging longevity value is 200 hours. This is to be compared to an uninhibited oven aging longevity value for a similarly pigmented polypropylene of only 5 hours.

EXAMPLE 6

In a manner similar to that described in Example 1, above, blends of polyallomer are prepared with various commercially available copper-containing pigments and N,N'-dibenzal-(oxalyl dihydrazide) stabilizer are prepared using the basic formula:

Material:                                  Parts
  Polyallomer of Example 4 _____ 9890
  Pigment _____ 100
  Stabilizer _____ 10

Results of the oven aging tests are shown in Table 1:

TABLE 1.—OVEN AGING TEST, HOURS TO FAILURE

| Pigment No.[1] | Oven aging longevity | Control[2] |
|---|---|---|
| 1 | 355 | 20 |
| 2 | 650 | 200 |
| 3 | 650 | 400 |
| 4 | 340 | 10 |
| 5 | 650 | 250 |
| 6 | 270 | 100 |
| 7 | 235 | 60 |

[1] All different commercially available copper-containing powder or pigments.
[2] No stabilizer used.

EXAMPLE 7

In a manner similar to that described in Example 1, above, 250 parts of a poly-1-butene polymer having the following characteristics:

Flow rate _____ 2.0
Density _____ 0.914
Softening point, ° C. _____ 110

5 parts of "Pigment No. 4" (of Table 1, above), and 2 parts of N,N'-dibenzal-(oxalyl dihydrazide) are blended together. The resulting specially stabilized pigmented polymer blend has an oven aging longevity of 300 hours, while an unstabilized, similarly pigmented poly-1-butene resin has an oven aging longevity of only about 10 hours.

EXAMPLE 8

Example 1 is repeated, except that in place of the N,N'-dibenzal (oxalyl dihydrazide) of Examples 1, 7 parts of oxalyl bis-4-methylbenzylidene hydrazide are utilized. The resulting stabilized material has an oven aging longevity of about 195 hours.

EXAMPLE 9

Example 8 is repeated, except that oxalyl bis-3-ethoxybenzylidene hydrazide is used in place of the oxalyl bis-4-methylbenzylidene hydrazide of Example 8. The resulting stabilized polymer has an oven aging longevity of about 190 hours.

EXAMPLE 10

Example 8 is repeated, except that 7 parts of oxalyl bis-4-chlorobenzylidene hydrazide are utilized as the copper inhibitor-stabilizer. The resulting stabilized material has an oven aging longevity of about 185 hours.

Similar beneficial results can be obtained by using the other benzal-type oxalyl dihydrazides described above in a manner such as is illustrated in the foregoing examples, with the other susceptible poly-α-olefine resins.

Still other unexpected benefits that can result from practicing the present invention are beneficial effects upon the physical characteristics of the polymer materials that are stabilized against copper degradation in accordance with the foregoing details. These additional benefits include an unexpected degree of increase in the flexural modulus of elasticity, in the tensile strength at upper yield, and in the products' density.

We claim:
1. A composition comprising:
 (A) at least one poly-α-olefin, and
 (B) a stabilizing amount of a benzal-type oxalyl dihydrazide having the formula

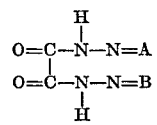

wherein A and B are selected from the group consisting of
(1) H₂, and
(2) benzyl-type radicals having the formula

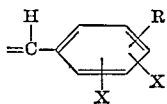

wherein R is a monovalent radical selected from the group consisting of hydrogen, alkyl radicals having 1 to 20 carbon atoms and alkoxy radicals having 1 to 20 carbon atoms, and X is independently hydrogen or halogen, at least one of A and B being a benzyl-type radical defined in (2) above.

2. A composition comprising
(A) at least one poly-α-olefin, and
(B) a stabilizing amount of N,N'-dibenzal-(oxalyl dihydrazide), N-benzal-(oxalyl dihydrazide), or mixtures thereof.

3. A composition comprising
(A) at least one poly-α-olefin, and
(B) a stabilizing amount of N,N'-dibenzal-(oxalyl dihydrazide).

4. A composition according to claim 3 wherein said poly-α-olefin is polyethylene, polypropylene, or a copolymer of ethylene and propylene.

5. A composition according to claim 3 wherein the stabilizing amount is within the range of about 0.001 to about 10.0 weight percent based on the poly-α-olefin.

6. A composition for coating copper wire comprising polypropylene and 0.001% to 10.0% by weight based on the polypropylene of N,N'-dibenzal-(oxalyl dihydrazide).

7. A composition comprising at least one poly-α-olefin, a pigmenting amount of a copper-containing pigment, and a stabilizing amount of N,N'-dibenzal-(oxalyl dihydrazide).

8. A composition comprising
(A) at least one poly-α-olefin, and
(B) from 0.1% to 3.0% by weight of
(1) N-benzal-(oxalyl diyhrdazide) and
(2) 2,6-bis(1-methylheptadecyl)-p-cresol, the ratio of (1) to (2) being in the range of 1:10 to 10:1.

References Cited

UNITED STATES PATENTS

| 3,117,104 | 1/1964 | Bown et al. | 260—45.9 |
| 3,347,938 | 10/1967 | Bell et al. | 260—45.95 |
| 3,357,944 | 12/1967 | Dexter et al. | 260—45.9 |

DONALD E. CZAJA, *Primary Examiner.*

HOSEA E. TAYLOR, JR., *Assistant Examiner.*

U.S. Cl. X.R.

260—45.9, 45.95